United States Patent
Lopez, Jr.

(10) Patent No.: US 8,347,792 B2
(45) Date of Patent: Jan. 8, 2013

(54) PORTABLE UTILITY SHELF

(75) Inventor: Albert Manuel Lopez, Jr., Lansing, MI (US)

(73) Assignee: Zepolla Innovations, LLC, Lansing, MI (US)

( * ) Notice: Subject to any disclaimer, the term of this patent is extended or adjusted under 35 U.S.C. 154(b) by 0 days.

(21) Appl. No.: 13/433,866

(22) Filed: Mar. 29, 2012

(65) Prior Publication Data
US 2012/0180302 A1    Jul. 19, 2012

Related U.S. Application Data

(63) Continuation-in-part of application No. 12/804,455, filed on Jul. 22, 2010, now abandoned.

(60) Provisional application No. 61/343,491, filed on Apr. 29, 2010.

(51) Int. Cl.
*A47B 23/00* (2006.01)

(52) U.S. Cl. ............................................ 108/42; 108/44

(58) Field of Classification Search .................. 108/42, 108/44, 152
See application file for complete search history.

(56) References Cited

U.S. PATENT DOCUMENTS

| | | | | |
|---|---|---|---|---|
| 2,506,789 | A | * | 5/1950 | Hyde ............................... 206/251 |
| 2,601,101 | A | * | 6/1952 | Derham ........................... 16/250 |
| 3,076,976 | A | | 2/1963 | Bogar |
| 3,153,400 | A | | 10/1964 | Mendels |
| 3,556,589 | A | | 1/1971 | Messier |
| 4,166,553 | A | * | 9/1979 | Fraterrigo ................... 222/181.2 |
| 4,615,464 | A | * | 10/1986 | Byrns ........................... 220/4.23 |
| 4,821,440 | A | | 4/1989 | Dunn |
| 4,932,701 | A | | 6/1990 | Cornillier et al. |
| 5,484,081 | A | * | 1/1996 | Jahn ............................... 220/759 |
| 5,669,660 | A | | 9/1997 | Matthies |
| 5,871,207 | A | | 2/1999 | Yoshida |
| 6,012,786 | A | | 1/2000 | Dunn |
| 6,065,251 | A | | 5/2000 | Kindrick |
| 6,308,641 | B1 | | 10/2001 | Kingbury |
| 6,394,002 | B1 | | 5/2002 | Blanchard et al. |
| 6,539,879 | B1 | | 4/2003 | Current et al. |
| 6,656,562 | B2 | | 12/2003 | Malpass et al. |
| 2001/0013452 | A1 | * | 8/2001 | Tiramani et al. .............. 190/124 |
| 2003/0034263 | A1 | | 2/2003 | D'Hoste |
| 2003/0038100 | A1 | | 2/2003 | Liu |
| 2003/0106979 | A1 | | 6/2003 | Richardson |
| 2006/0137937 | A1 | | 6/2006 | Pratt |
| 2008/0011918 | A1 | | 1/2008 | Bruce et al. |
| 2008/0035590 | A1 | | 2/2008 | Huang |
| 2008/0179268 | A1 | | 7/2008 | Jang |
| 2008/0223676 | A1 | | 9/2008 | Chuang |
| 2008/0258035 | A1 | | 10/2008 | Wichelhaus |
| 2010/0038393 | A1 | | 2/2010 | Zhang |
| 2010/0066017 | A1 | | 3/2010 | Gowri et al. |

FOREIGN PATENT DOCUMENTS

WO    WO 2010/040754 A1    4/2010

* cited by examiner

*Primary Examiner* — Jose V Chen
*Assistant Examiner* — Matthew Ing
(74) *Attorney, Agent, or Firm* — Mary M. Moyne; Fraser Trebilcock (57) ABSTRACT

A portable utility shelf having a first shell pivotably connected to a second shell. A channel having a slot is located in the front surface of at least one of the shells. A fastener is mounted in the slot in the channel. The fastener allows for mounting one shell on an attachment surface and pivoting the utility shelf to an open position to create a work surface on the other shell.

20 Claims, 10 Drawing Sheets

PORTABLE UTILITY SHELF

CROSS REFERENCES TO RELATED APPLICATIONS

This is a continuation-in-part of U.S. application Ser. No. 12/804,455 filed Jul. 22, 2010, now abandoned, which claims the benefit of U.S. Provisional Application No. 61/343,491, filed Apr. 29, 2010 which are hereby incorporated herein by reference in their entirety, except that the present application supersedes any portion of the above referenced applications which are inconsistent with the present application.

STATEMENT REGARDING FEDERALLY SPONSORED RESEARCH OR DEVELOPMENT

Not Applicable

BACKGROUND OF THE INVENTION (1) Field of the Invention

The present invention relates to a portable utility shelf In particular, the present invention relates to a portable utility shelf which can be quickly connected to and disconnected from an attachment surface or article, and which provides a user with a hands free shelf and a portable workspace.

(2) Description of Related Art

Laptop carriers are known in the art. In the past, laptop carriers have required attachment to a user, such as a strap around the user's neck, or have required a stand, such as a tabletop. Other examples include utility shelves that require permanent attachment to an object. Thus, utility shelves known in the art are either permanently attached to an object and are not portable, or require attachment to the user or a bulky framework that isn't easily transported by a user for use in a variety of environments.

If a user must hold a laptop computer in one hand, while being required to input data with the other hand, it is impossible to maintain efficient keyboard entry or perform other cursor control (e.g., touch-pad and attaching interrogation cables to an electric meter). Furthermore, if the user must perform a task (such as hand writing notes) during keyboard entry, it is not suitable to have the laptop connected to the user.

There remains a need for a portable utility shelf that can be easily manufactured via an injection molding process and where only one mold is required to make the utility shelf.

Further, there remains a need for a simple, easy-to-use, easy-to-transport, easy-to-manufacture, portable utility shelf that is self supportive to aid a user in supporting a laptop in a variety of environments and to perform a variety of tasks.

Still further, there remains a need for a portable utility shelf that allows a user to quickly and simply attach a utility shelf to an attachment surface or object and to enable a user to efficiently enter data into a laptop in a hands free mode.

BRIEF SUMMARY OF THE INVENTION

A portable utility shelf having a first shell with a front surface and a back surface pivotably connected to a second shell having a front surface and a back surface. The first and second shells are connected together by a snap hinge on the bottom of the shells. The first and second shells are secured in a closed position when not in use by a slide latch on the top of the shells. In one (1) embodiment, to unlatch the slide latch to move the utility shelf to the open position, the shells are moved in opposite side to side directions so that the first half of the slide latch on the first shell is moved out of contact with the second half of the slide latch on the second shell. In the closed position, the top of the first shell is adjacent the top of the second shell and the back surface of the first shell is adjacent the back surface of the second shell. A hinge stop is provided on the bottom of the shells and limits the angle between the shells when the utility shelf is in the open position. In one (1) embodiment, the utility shelf includes a plurality of hinge stops which also act as feet for the utility shelf when the utility shelf is in the closed position and not in use. A channel is located in the front surface of the first shell. In one (1) embodiment, both the front surface of the first shell and the front surface the second shell have a channel. In one (1) embodiment, the channel is a horizontal channel extending between the sides of the first shell. In one (1) embodiment, the channel is a vertical channel extending between a top and a bottom of the first shell. In one (1) embodiment, the first shell has a vertical channel and a horizontal channel which form a T-shaped channel on the front surface of the first shell. A fastener is mounted in the channel. In one (1) embodiment, a fastener is mounted in both the channel in the first shell and the channel in the second shell. In one (1) embodiment, a plurality of fasteners is mounted in the channels. The fastener is removably mounted in the channel. The fastener is slidably mounted in the slot in the channel. The fastener allows the utility shelf to be easily and quickly connected an object. The fastener is selected and positioned in the channel based on the type of attachment surface or object and the intended us of the utility shelf In one (1) embodiment, the utility shelf is constructed of injection molded plastic. In one (1) embodiment, the first and second shells are constructed as two (2) separate pieces. In one (1) embodiment, the first and second shells are essentially identical.

In one (1) embodiment, all the components of the utility shelf, excluding the fastener, are constructed of the same material. In one (1) embodiment, the utility shelf is used as a portable holder for a laptop computer.

The present invention relates to a utility shelf having a first shell having a first surface with a channel in the first surface, a second shell pivotably mounted to the first shell adjacent a side opposite the first surface of the first shell, and a fastener mounted in the channel in the first surface of the first shell.

Further, the present invention relates to a method for providing a portable utility shelf mounted on an object which includes providing a utility shelf having a first shell having a top and an opposed bottom with a first surface and a second surface extending therebetween and having a channel in the first surface, a second shell having a top and an opposed bottom with a first surface and a second surface extending therebetween, the first and second shells pivotably connected together at the bottom so that in a closed position, the second surface of the first shell is adjacent the second surface of the second shell and the top of the first shell is adjacent the top of the second shell, providing a fastener mounted in the channel in the first surface of the first shell wherein the fastener is selected based on the object and an intended use of the shelf, positioning the fastener in the channel based on the object and the intended use of the shelf, mounting the first shell on the object so that the fastener is in contact with the object and the utility shelf is secured to the object, and moving the utility shelf to an open position so that the top of the second shell is pivoted away from the top of the first shell and extends outward from the object and so that the second surface of the second shell creates a work surface.

The substance and advantages of the present invention will become increasingly apparent by reference to the following drawings and the description.

DETAILED DESCRIPTION OF THE INVENTION

Reference will now be made to the drawings wherein like numerals refer to like parts throughout.

Figure 6:
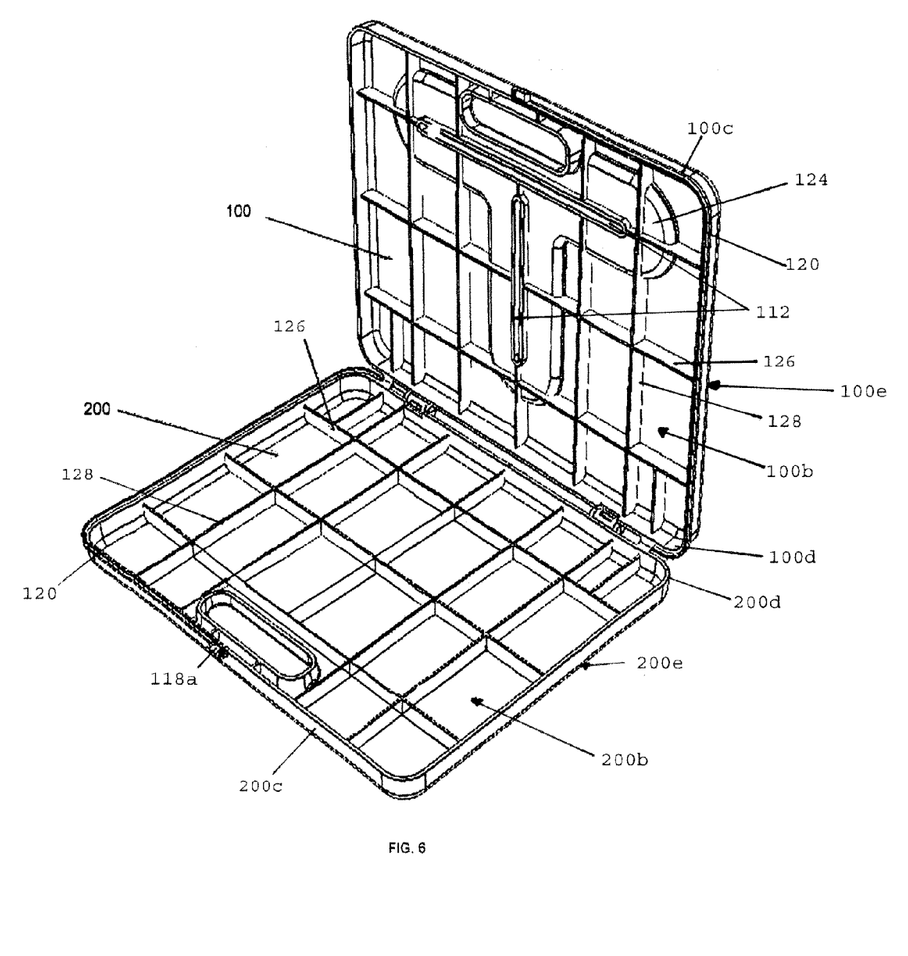
FIG. 6 is a perspective view of the portable utility shelf 10 in an open position, showing the first shell 100 and the second shell 200.
Figure 7:
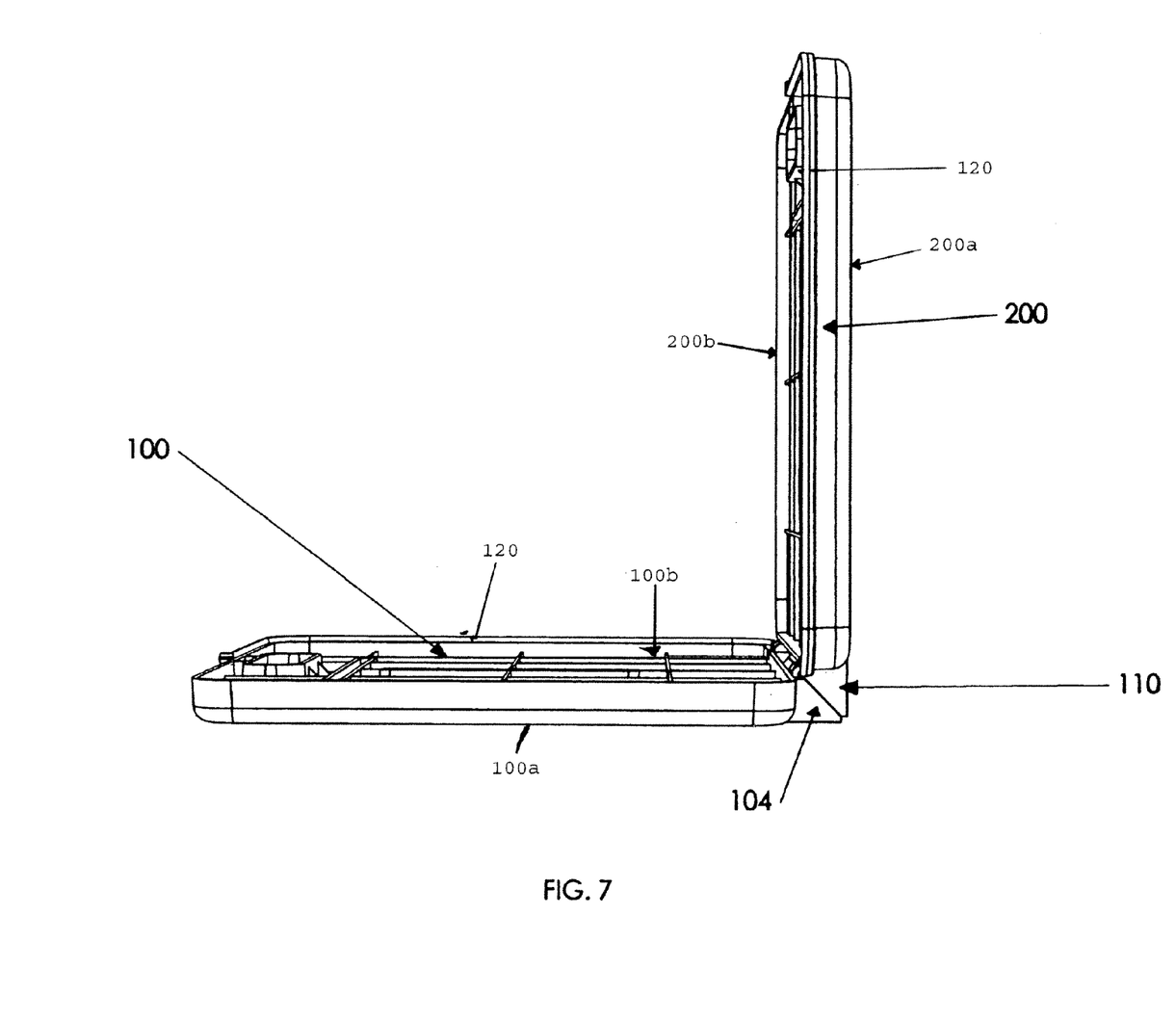
FIG. 7 is a side view of the portable utility shelf 10 in an open position showing the first shell 100 and the second shell 200, the opposite side being a mirror image thereof.
Figure 8:
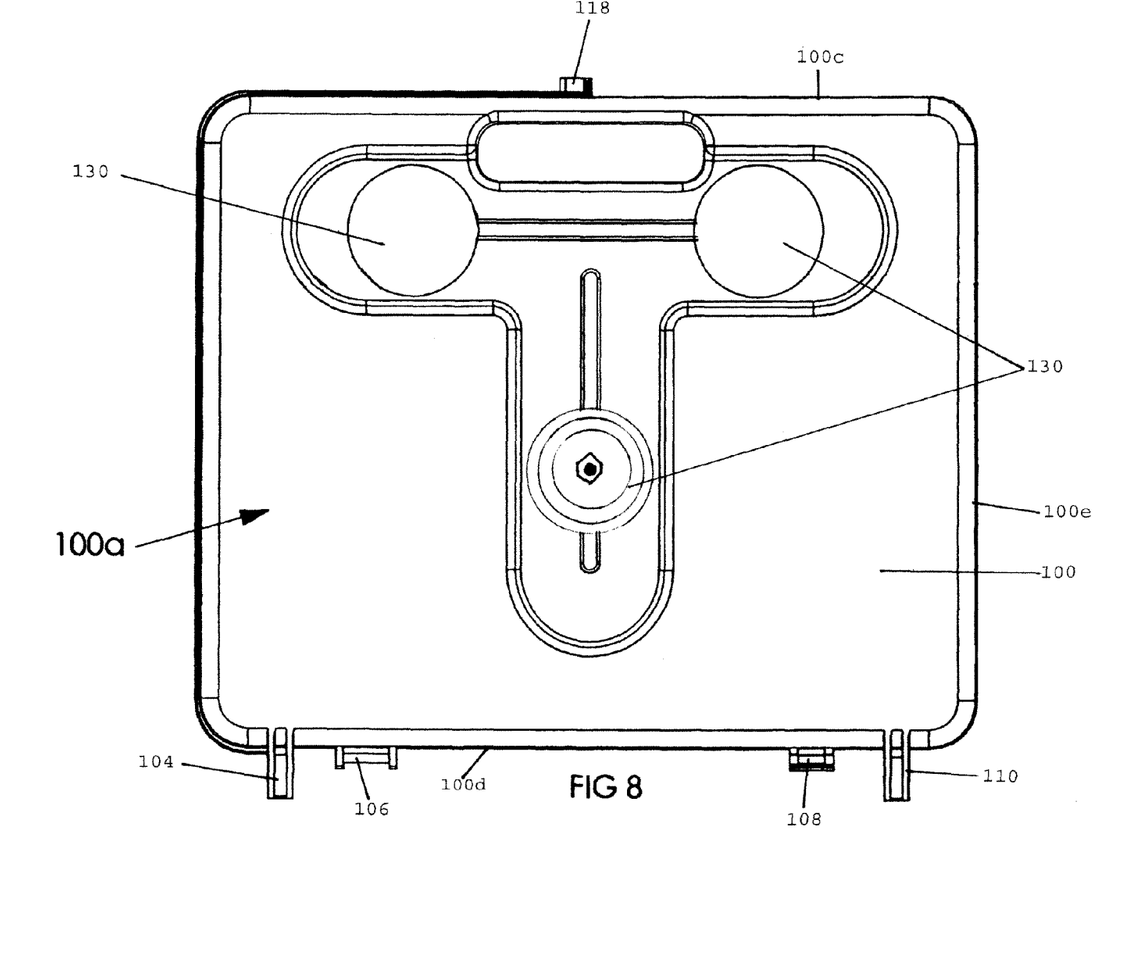
FIG. 8 is a front view of the first shell 100 of the portable utility shelf 10 showing the fasteners 130 in the front surface 100a of the first shell 100.
Figure 9:
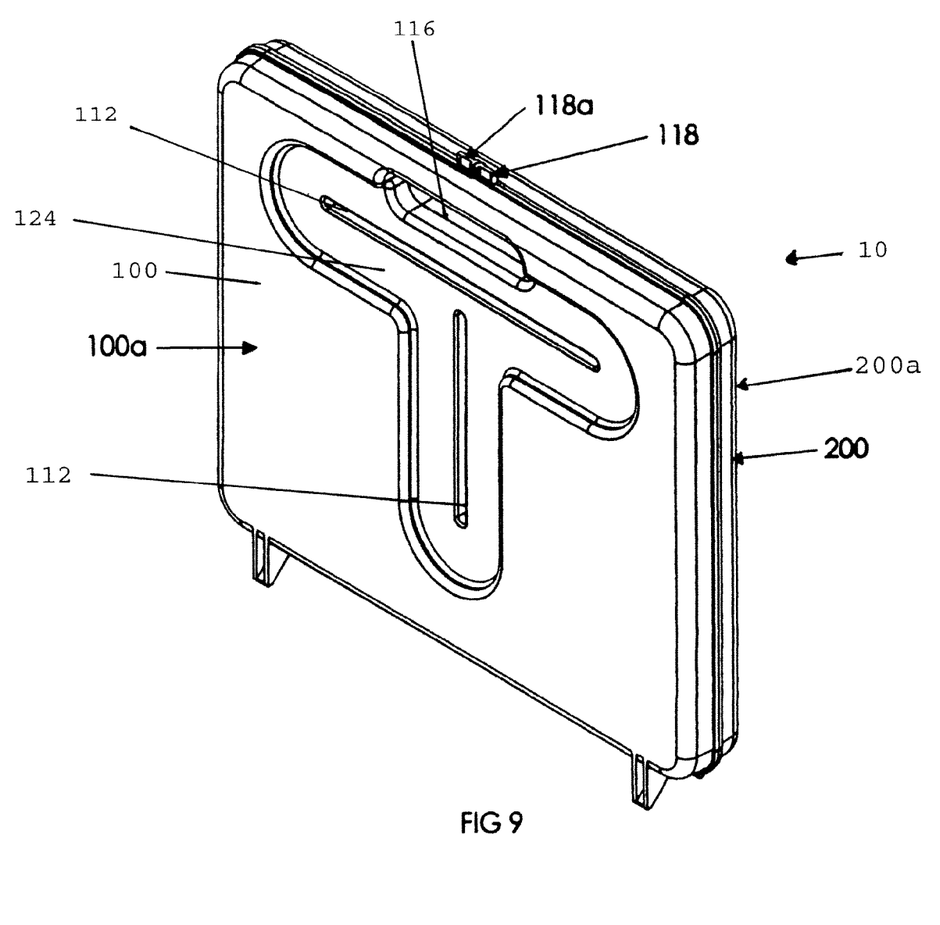
FIG. 9 is a perspective front view of the portable utility shelf 10 in the closed position.

The portable utility shelf 10 of the present invention includes a first shell 100 and a second shell 200. Each shell 100 and 200 has a front surface or front surface 100a and 200a and a back surface or back surface 100b and 200b with a top 100c and 200c and a bottom 100d and 200d and opposed sides 100e and 200e extending therebetween. The first shell 100 and second shell 200 may be essentially identical or may have different configurations (FIGS. 6 and 9). The front surface 100a of the first shell 100 is constructed to enable a user to attach the front surface 100a of the first shell 100 to an attachment surface or object and use the back surface 200b of the second shell 200 as an adjustable, hands free workstation or work surface for an item, such as a laptop. In one (1) embodiment, the second shell 200 has the same configuration as the first shell 100, and thus, either the front surface 100a of the first shell 100 or the front surface 200a of the second shell 200 can be attached to the attachment surface or object and either the back surface 200b of the second shell 200 or the back surface 100b of the first shell 100 can be used to create the workstation. The embodiment having essentially identical first and second shells 100 and 200 allows the manufacturer to use the same mold, to create both the first shell 100 and the second shell 200 which results in a lower cost to construct the utility shelf 10.

The first and second shells 100 and 200 are pivotably connected together by a hinge mounted on the bottom 100d and 200d of the shells 100 and 200. The hinge allows for the first and second shells 100 and 200 to rotate from a closed position to an open position and vice versa. In one (1) embodiment, the hinge is a snap hinge. The snap hinge includes a pivot shaft 106 and a half sleeve 108. In one (1) embodiment, the pivot shaft 106 is located on one shell 100 or 200 and the half sleeve 108 is located on the other shell 200 or 100. In one (1) embodiment, a plurality of snap hinges is located on the bottom 100d and 200d of the shells 100 and 200. In the embodiment where the first and second shells 100 and 200 are essentially identical, each shell 100 or 200 has a pivot shaft 106 and a half sleeve 108 adjacent opposed sides 100e and 200e of the shells 100 and 200. In one (1) embodiment, the components of the snap hinge(s) are integrally molded in the shells 100 and 200 and are constructed of the same material as the utility shelf 10. In one (1) embodiment, the snap hinge is formed as part of the shell 100 or 200. In one (1) embodiment, the snap hinge is formed using injection molding or the like for production purposes. It is understood that any type of hinge well known in the art may be used to pivotably connect the shells 100 and 200 of the utility shelf 10 together. There are several other methods and types of hinges that can be utilized such as a simple metal hinge, or pinned hinge.

The utility shelf 10 has hinge stops on the bottom. The hinge stops have a first section 104 and a second section 110. In one (1) embodiment, the utility shelf 10 has at least one hinge stop adjacent each side 100e or 200e of the shells 100 and 200 of the utility shelf 10. In one (1) embodiment, the utility shelf 10 has three (3) hinge stops with a hinge stop adjacent each side 100e and 200e of the shells 100 and 200 of the utility shelf 10 and a third hinge stop spaced between the other two (2) hinge stops. In one (1) embodiment, at least one snap hinge is spaced between the hinge stops. The first section 104 of the hinge stop is mounted on the bottom 100d of the first shell 100 and the second section 110 is mounted on the bottom 200d of the second shell 200 directly opposite the first section 104. In one (1) embodiment, the sections 104 and 110 of the hinge stops are essentially identical. The sections 104 and 110 of the hinge stops extend outward from the bottom 100d and 200d of the shells 100 and 200 in a direction opposite the top 100c and 200c of the shells 100 and 200. In one (1) embodiment, the first and second sections 104 and 110 of the hinge stops have an essentially triangular shape with the base of the triangle mounted on the bottom 100d and 200d of the shells 100 and 200 and the apex extending outward in a direction opposite the top 100c and 200c of the shells 100 and 200. In one (1) embodiment, the hinge stops do not extend out beyond plane A-A formed by the front surface 100a or 200a of the first or second shells 100 or 200. The hinge stops may be configured as any stop well known in the art. The hinge stops function to inhibit rotation of the snap hinge of the first and second shells 100 and 200 past a certain point so that when a user opens the utility shelf 10, the first and second shells 100 and 200 open at a predetermined angle. In one (1) embodiment, the predetermined opening angle is 90 degrees. In another embodiment, the hinge stops are configured so that the first and second shells 100 and 200 open at other angles, such as, for example, 180 degrees, 145 degrees, 120 degrees, 100 degrees, 45 degrees or 25 degrees. In one (1) embodiment, the sections 104 and 110 of the hinge stops are integrally molded with and made of the same material as the utility shelf 10.

Optionally, the top of the utility shelf 10 is provided with a handle 116. In one (1) embodiment, the handle 116 is integrally molded with and constructed of the same material as the utility shelf 10. The handle 116 may be molded into the first shell 100 and the second shell 200 of the utility shelf 10 during the manufacturing process. In one (1) embodiment, the handle 116 is formed when the first and second shells 100 and 200 are in the closed position. The handle 116 can be configured in any shape. In one (1) embodiment, the handle 116 has an oval shape.

Figure 1:
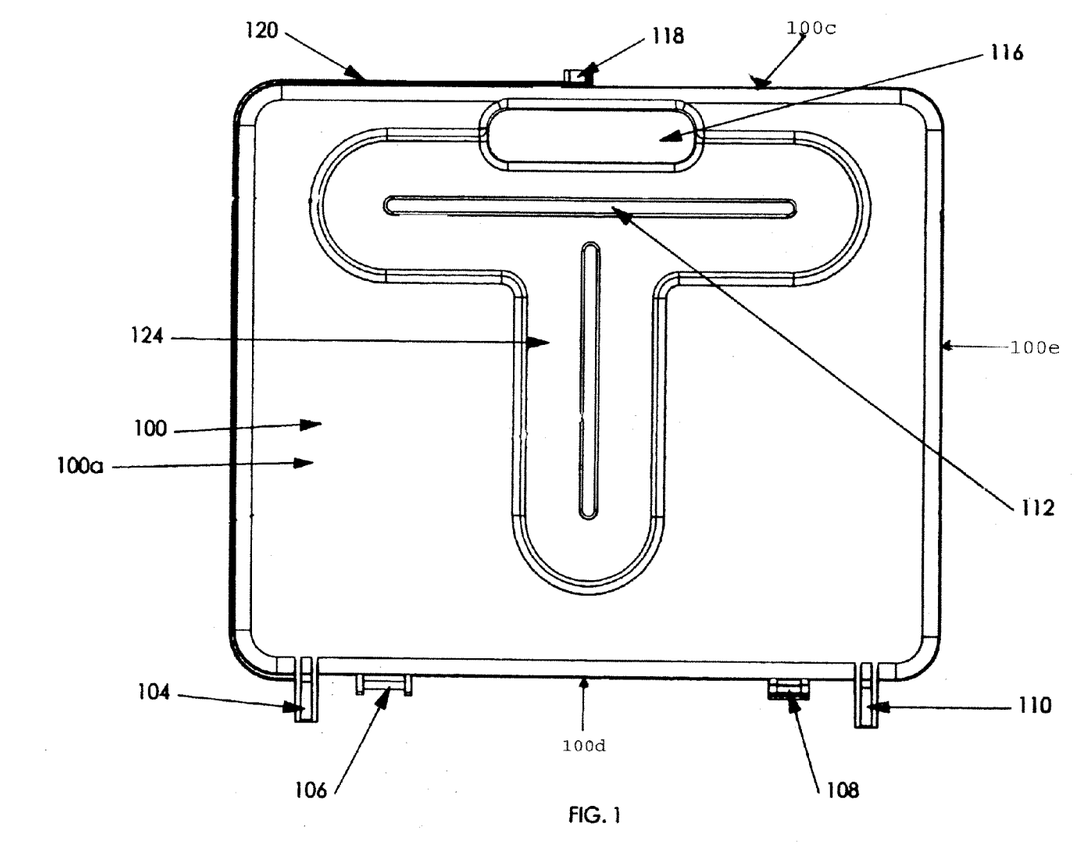
FIG. 1 is a front view of the first shell 100 of the portable utility shelf 10 showing the front surface 100a of the first shell 100.
Figure 2:
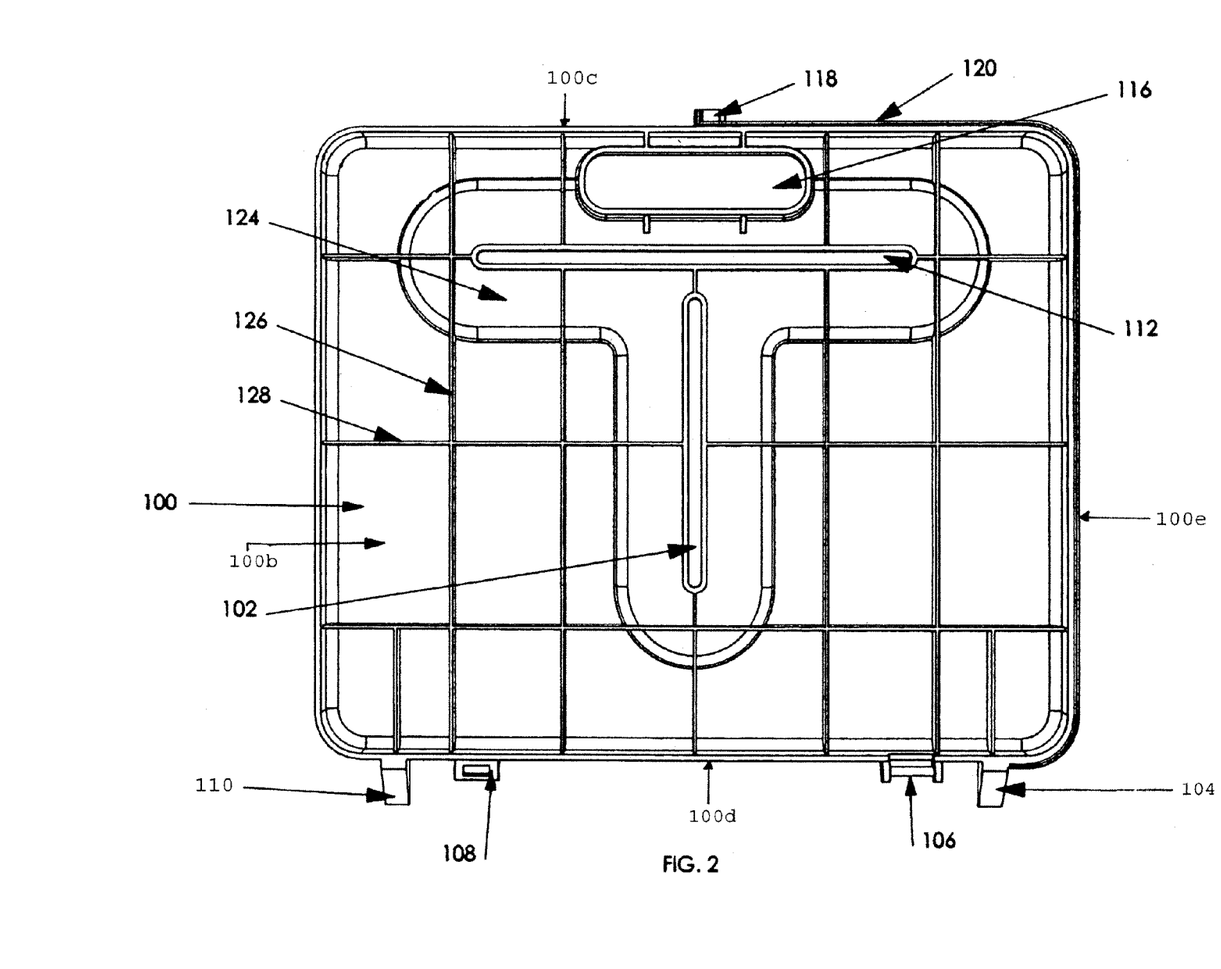
FIG. 2 is a back view of the first shell 100 of the portable utility shelf 10 showing the back surface 100b of the first shell 100.
Figure 3:
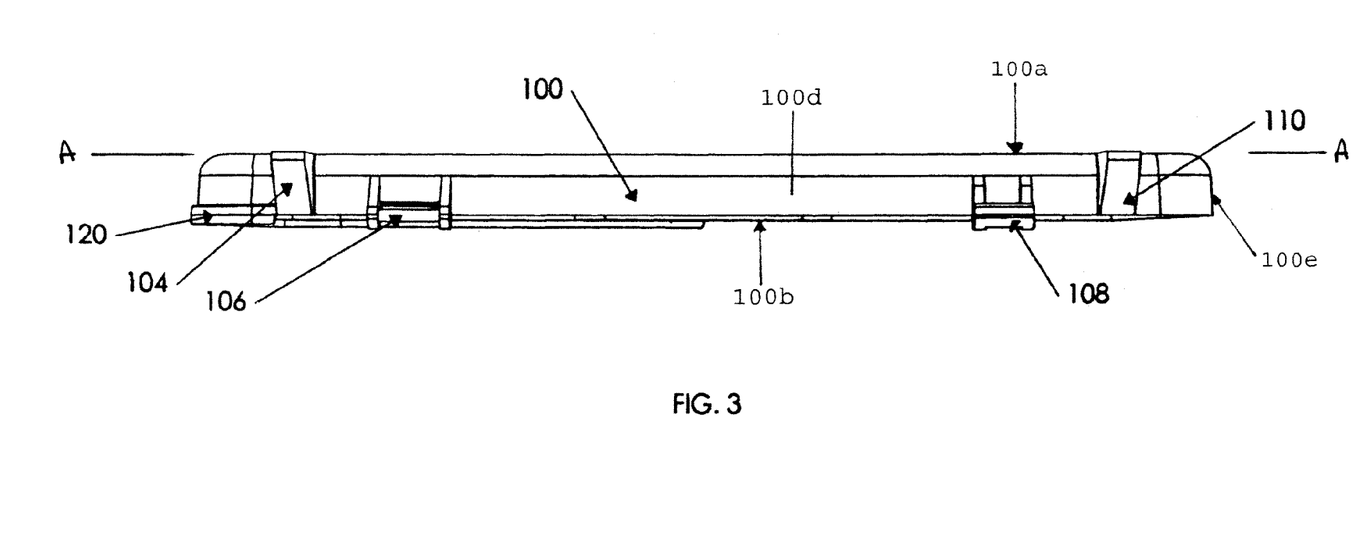
FIG. 3 is a bottom view of the first shell 100 of the portable utility shelf 10.
Figure 4:
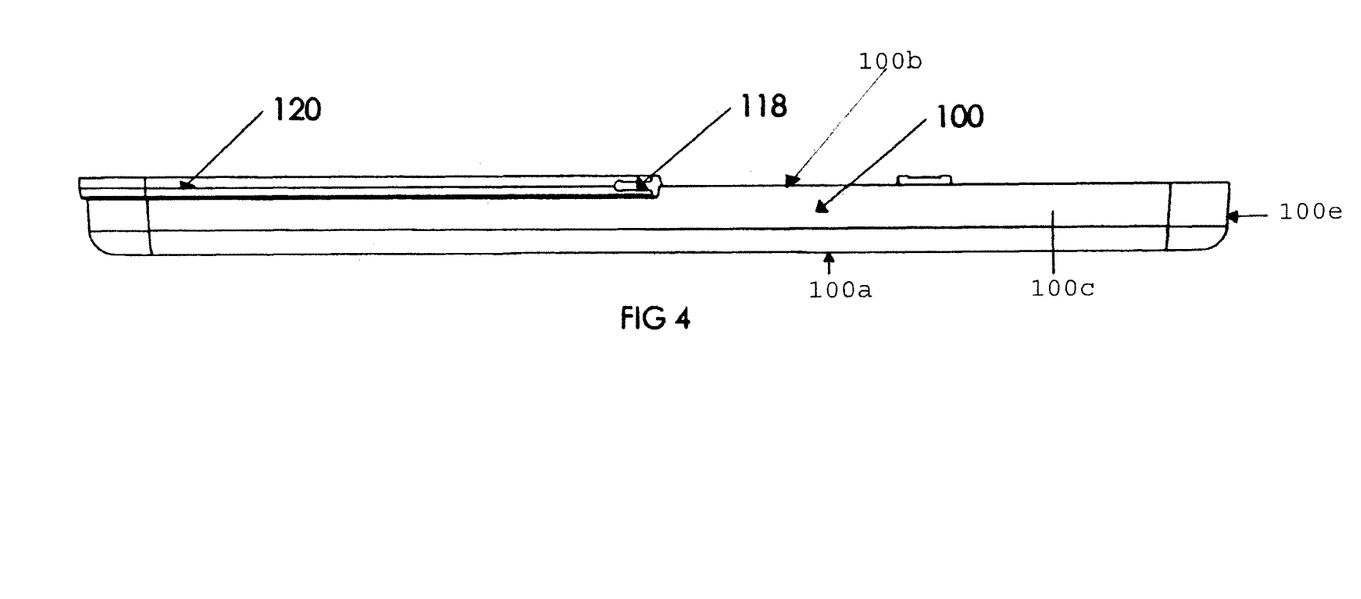
FIG. 4 is a top view of the first shell 100 of the portable utility shelf 10.
Figure 5:
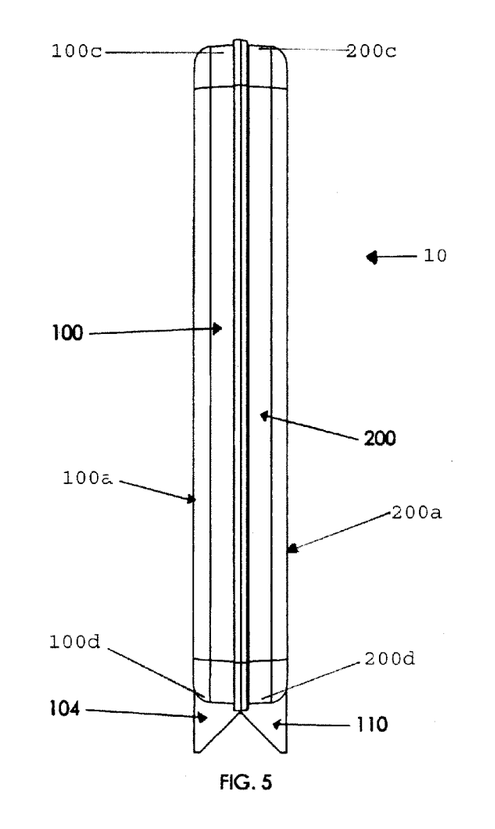
FIG. 5 is a side view of the portable utility shelf 10, opposite side being a mirror image thereof.

A slide latch is provided on the top of the utility shelf 10. The slide latch includes a first half 118 located of the top 100c of the first shell 100 and a second half 118a located on the top 200c of the second shell 200. The slide latch functions to secure the first shell 100 and the second shell 200 together when the utility shelf 10 in the closed position. In one (1) embodiment, the slide latch is a pressure latch. It is understood that any latch well known in the art may be used such as, a push button latch, hasp latch, bolt latch etc. In one (1) embodiment, the first half 118 and the second half 118a of the slide latch are integrally molded with and constructed of the same material as the first and second shells 100 and 200 of the utility shelf 10. In one (1) embodiment, the first shell 100 has an outer lip 120 which allows for the first and second shells 100 and 200 to be easily aligned when the utility shelf 10 is in the closed position (FIG. 4). In one (1) embodiment, the outer lip 120 extends from the first half 118 of the slide latch across the top 100c of the first shell 100, down along one side 100e of the first shell 100 and partially along the bottom 100d of the first shell 100. In one (1) embodiment, the first half 118 of the slide latch is mounted on the outer lip 120. The outer lip 120 may also be integrally molded with and made of the same material as the utility shelf 10. In one (1) embodiment, where the first and second shells 100 and 200 are essentially identical, the outer lip 120 on the first shell 100 and the outer lip 120 on the second shell 200 act to create a complete lip over the interface of the two shells 100 and 200 along the top 100c and 200c and sides 100e and 200e of the shells 100 and 200 and a portion of the bottom 100d and 200d of the shells 100 and 200. The outer lips 120 or complete lip extend over the interface and make it difficult to insert a pry bar between the shells 100 and 200 to force the shells 100 and 200 apart and open the utility shelf 10. The extension of the complete lip over the interface of the two shells 100 and 200 also makes the utility shelf 10 weather proof such that in the closed position water cannot easily seep between the first and second shells 100 and 200 thus helping to keep the contents on the inside of the utility shelf 10 dry.

Figure 10:
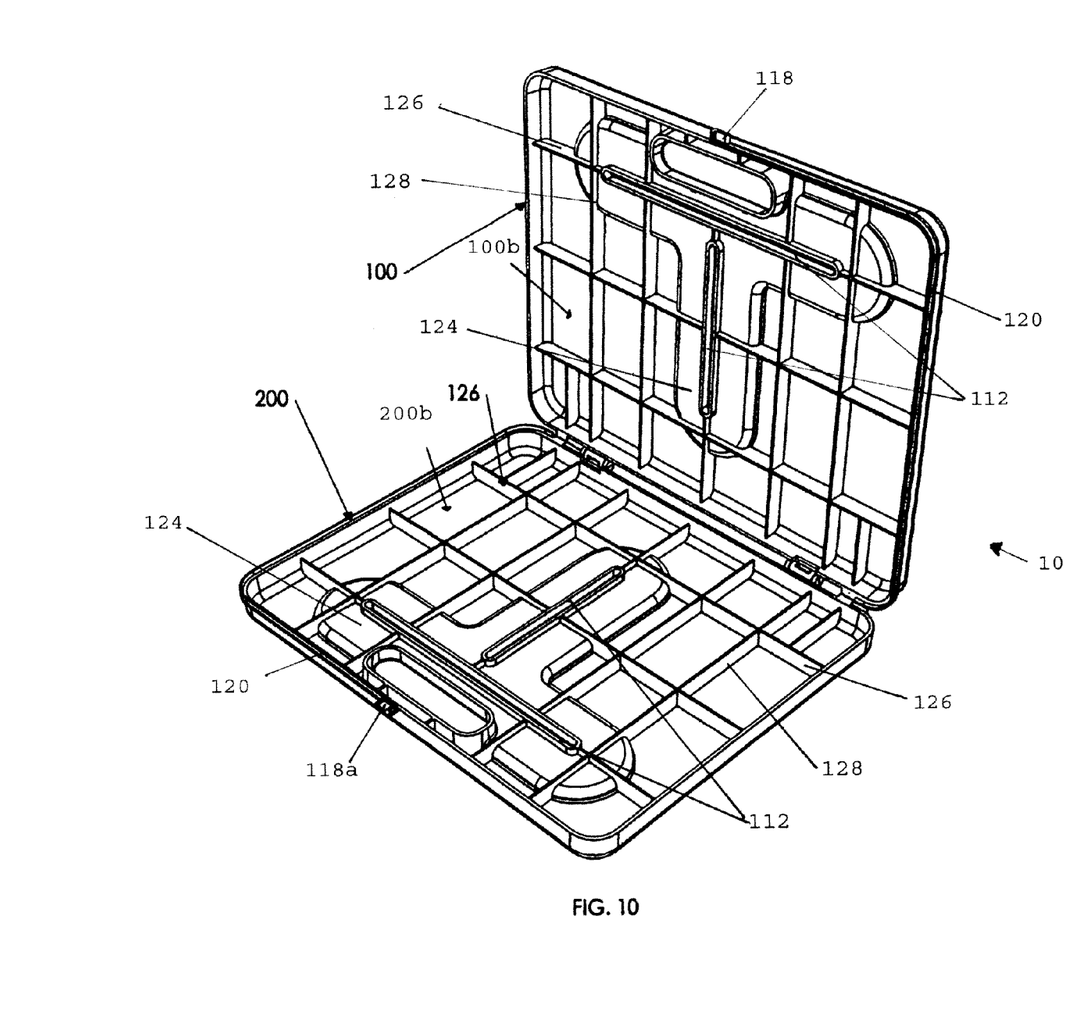
FIG. 10 is an alternative perspective view of the portable utility shelf 10 in an open position, showing the first and second shells 100 and 200 where the first and second shells 100 and 200 are essentially identical.

The front surface 100a of the first shell 100 has a channel 124. In one (1) embodiment, front surface 200a of the second shell 200 has a channel. In one (1) embodiment, both the front surface 100a of the first shell 100 and the front surface 200a of the second shell 200 have a channel 124 (FIG. 10). The channel 124 is an indention or recess is the front surface 100a or 200a of the shell 100 or 200. In one (1) embodiment, the channel 124 is configured in a horizontal orientation extending between a top 100c or 200c and bottom 100d or 200d of the shell 100 or 200. In one (1) embodiment, the channel 124 is configured in a vertical orientation extending between the sides 100e or 200e of the shells 100 or 200. In another embodiment, the channel 124 is configured in both a horizontal and vertical configuration forming a T-shaped channel. In one (1) embodiment, the horizontal and vertical channel(s) 124 are formed as one continuous channel. In one (1) embodiment, the channel 124 has an elongated oval shape with rounded ends. In one (1) embodiment, the channel 124 has parallel sides between the ends. In one version of the embodiment where the channel 124 has a horizontal orientation, the channel essentially extends between the sides 100e or 200e of the first or second shell 100 or 200 and extends parallel to a top 100c or 200c of the shell 100 or 200. In one (1) embodiment, the opening for the handle 116 extends into the horizontal channel 124. In one version of the embodiment where the channel 124 has a vertical orientation, the channel 124 extends essentially perpendicular to the top 100c or 200c and bottom 100d or 200d of the shells 100 or 200.

A slot 112 is provided in the channel 124. The slot 112 extends completely through the shell 100 or 200. In the one (1) embodiment where the channel 124 has a horizontal orientation, the slot 112 extends essentially horizontally. In one (1) embodiment, the horizontal channel 124 and the horizontal slot 112 are adjacent a top 100c or 200c of the shell 100 or 200. In the one (1) embodiment where the channel 124 has a vertical orientation, the slot 112 extends essentially vertically. In one (1) embodiment, the vertical slot is essentially spaced an equal distance between the sides 100e or 200e of the shell 100 or 200. In one (1) embodiment, there are two (2) spaced apart vertical slots 112 in the vertical channel 124. In one (1) embodiment, the slot 112 is centered between the sides of the channel 124. In one (1) embodiment, the slot 112 is centered between the ends of the channel 124. In one (1) embodiment, the slot 112 does not extend to the ends of the channel 124. In the embodiment where a horizontal and vertical channel form a T-shaped channel 124, the horizontal portion of the channel 124 has a first slot and the vertical portion of the channel 124 has a second slot. In one (1) embodiment, the first and second slots do not intersect. In one (1) embodiment, the first and second slots extend perpendicular to each other.

An attachment object or fastener 130 is provided for attaching the utility shelf 10 to an attachment surface or object. The fastener 130 is movably mounted in the slot 112 in the channel. In one (1) embodiment, a plurality of fasteners 130 is mounted in the slot or slots 112 in the channels 124 of one of the shells 100 or 200. The fastener 130 can be quickly attached to the attachment surface. The fastener 130 can be quickly disconnected from the attachment surface. In another embodiment, the fastener 130 is capable of a quick connect and disconnect from the attachment surface or object. In one (1) embodiment, the fastener 130 is constructed of a magnetic material. In another embodiment, the fastener 130 is a magnet. In another embodiment, the fastener 130 is a suction cup. The type and size of the fastener 130 depends on the amount of weight that will be required to be supported by the utility shelf 10 and the type of attachment surface or object to which the utility shelf 10 will be attached. In one (1) embodiment, the fastener 130 is a 90 lb pull magnet. In another embodiment, fastener 130 is selected to attach the utility shelf 10 to a stationary material made of metal or an alloy thereof In another embodiment, fastener 130 is selected to attach the utility shelf 10 to a stationary object constructed of a non-metal material. In one (1) embodiment, the fastener 130 is a suction cup.

The fastener 130 is movably mounted in the slot so that the fastener 130 can be slidably adjusted along the slot 112. In one (1) embodiment, the fastener 130 is secured with a bolt and nut in the slot 112. However, it is understood, that any means well know in the art which allows for removably and slidably mounting the fastener 130 in the slot can be used. In one (1) embodiment, the fastener 130 extends beyond the front surface 100a of the shell 100 or 200 such that the fastener 130 contacts the attachment surface or object first and so that when the utility shelf 10 is mounted on an attachment surface or object, the shell 100 or 200 is spaced apart from the attachment surface or object and is only in contact with the attachment surface or object through the fastener 130. In one (1) embodiment, the fastener 130 has an fastening surface and a plane formed by the attachment surface is essentially parallel to the plane A-A formed by the front surface 100a of the shell 100. In one (1) embodiment, the fastener 130 is removably mounted in the slot 112 and can be adjusted along the length of the slot 112 or can be moved to a different slot 112 depending on the attachment surface or object to which the utility shelf 10 is to be attached. In one (1) embodiment, the fastener 130 has a circular crossection.

In one (1) embodiment, the back surface 100b of the first shell 100 has a plurality of horizontal ribs 126 which add strength and support to the first shell 100. In one (1) embodiment, the back surface 100b of the first shell 100 has a plurality of vertical ribs 128 which add strength and support to the first shell. In one (1) embodiment, the back surface 100b of the first shell 100 has both horizontal and vertical ribs 126 and 128. In one (1) embodiment, the back surface 200b of the second shell 200 has both horizontal and vertical ribs 126 and 128. The ribs 126 and 128 increase the strength and support of the shells 100 and 200, and allow for using less material in the manufacturing process, resulting in a thinner, lighter weight utility shelf 10. The ribs 126 and 128 also create secure compartments to hold small objects, such as fittings, washers, nuts electrical connecters, etc. In one (1) embodiment, the ribs 126 and 128 are integrally molded in the first and second shells 100 and 200. In one (1) embodiment, the ribs 126 and 128 are constructed of the same material as the shells 100 and 200.

The utility shelf 10 can be constructed of any lightweight, durable material well known in the art. In one (1) embodiment, the utility shelf 10 is comprised of an injection molded polymeric material. The polymeric material may be selected from a plastic material, such as, a polypropylene homopolymer material. Other plastic materials which would be suitable for fabricating the utility shelf 10 include PS (polystyrene), CPET (crystalline polyethylene terephthalate), APET (amorphous polyethylene terephthalate), HDPE (high density polyethylene), PVC (polyvinyl chloride), PC (polycarbonate), and foamed polypropylene.

The utility shelf 10 may be manufactured by an injection molding process or any process known the art. In one (1) embodiment, the first shell 100 and the second shell 200 are injection molded using only two (2) molds, which are snap fitted together. Accordingly, the two molds may be fitted together via the hinge stops 104 and 110 attached at opposite ends of the bottom 100d of the first shell 100 and second shell 200.

The portable utility shelf 10 can be utilized in several ways and applications. In one (1) embodiment, the utility shelf 10 is used in the electric utility industry to provide a hands free, safe workplace to operate a laptop computer in the field. Accordingly, the utility shelf 10 can be quickly attached to an electric meter using the fastener 130. In other embodiments, the utility shelf 10 can be used in a variety of other industries or trades for a variety of uses. In one (1) embodiment, the U.S. Military uses the utility shelf 10 to attach a laptop computer to a vehicle during an operation. The utility shelf 10 can also be used to support ammunition, to clean a weapon, do paperwork, or as a lunch table. Contractors can use the utility shelf 10 as a work surface for doing paperwork, as a lunch table or to support a laptop when out in the field and a user wants to be outside their vehicle to watch crews. For home use, the utility shelf 10 can be attached to windows for painting, to hold plants, or knickknacks, clothes, pictures, etc. The automotive industry can utilize the portable utility shelf 10 for a work table for putting tools on while working under a vehicle. In one (1) embodiment, the utility shelf 10 is attached to a fender of a car or a car door sill to set up tools. EMS or law enforcement personnel can utilize the portable utility shelf 10 to aid in an investigation or aid in treatment, when something has to be off the ground. The medical field can utilize the portable utility shelf 10 in an operating room where there is a need for extra space to hold surgical equipment or the like.

To use the utility shelf 10, the fastener or fasteners 130 are positioned in the slot 112 or slots in the channel 124 or channels in the first or second shells 100 and 200 of the utility shelf 10. It is understood that multiple fasteners 130 can be mounted in the first and second shells 100 and 200 and all the fasteners 130 might not always be used when the utility shelf 10 is in use. The fastener or fasteners 130 are selected and positioned based on the size and type of the attachment surface as well as the weight or type of item to be supported by the utility shelf 10 when in use. Once the utility shelf 10 is correctly configured, the slide latch is unlatched to allow the first shell 100 to be pivoted away from the second shell 200 to move the utility shelf 10 into the open position. In one (1) embodiment, to unlatch the slide latch, the first shell 100 is moved sideways relative to the second shell 200 such that the first half 118 of the slide latch moves away from and out of contact with the second half 118a of the slide latch. The hinged connection of the first and second shells 100 and 200 allows the shells 100 and 200 to be moved in opposite side to side directions enabling the halves 118 and 118a of the slide latch to move apart and unlatch. Next the fastener 130 is secured to the attachment surface. In one (1) embodiment, when the fastener 130 on the first shell 100 is secured on the attachment surface, the utility shelf 10 is pivoted to the fully open position so that the first shell 100 is essentially parallel and adjacent to the attachment surface and the second shell 200 extends outward at an angle from the attachment surface. In this embodiment, the back surface 200b of the second shell 200 is used as the work surface of the utility shelf 10. In one (1) embodiment, the second shell 200 extends outward at a 90 degree angle from the attachment surface and the first shell 100. In the embodiment where both the first and second shells 100 and 200 can mount fasteners 130, the utility shelf 10 can also be mounted to the attachment surface or object in the opposite configuration with the second shell 200 essentially parallel and adjacent to the attachment surface and the first shell 100 extending outward at an angle from the attachment surface. In this embodiment, the back surface 100b of the first shell 100 is used as the work surface of the utility shelf 10. As the shells 100 and 200 of the utility shelf 10 pivot to the open position, the hinge stops on the first shell 100 contact the hinge stops on the second shell 200. The contact of the hinge stops stops the pivoting motion of the shells 100 and 200 and prevents the shells 100 and 200 from pivoting beyond a predetermined angle. The hinge stops also act to provide additional support to the utility shelf 10 in the open position by relieving some of the stress on the snap hinge. In one (1) embodiment, the utility shelf 10 is attached to the attachment surface or object before the slide latch is unlatched and the utility shelf 10 is moved from the closed position to the fully open position after the utility shelf 10 is attached to the attachment surface or object. The ability to slide one shell 100 or 200 in a side to side direction without moving the other shell 200 or 100 enables the utility shelf 10 to be opened while one shell 100 or 200 is firmly and securely attached to the attachment surface or object.

In the foregoing description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are here by incorporated by reference herein in their entirety, with each claim standing on its own as a separate embodiment of the present invention.

It is intended that the foregoing description be only illustrative of the present invention and that the present invention be limited only by the hereinafter appended claims.

I claim:

1. A utility shelf which comprises:
   a) a first shell having a top and an opposed bottom with sides extending therebetween and a first surface with a channel in the first surface, the channel having a t-shape with an essentially horizontal section extending between the sides of the first shell essentially parallel to the top and bottom of the first shell and an essentially vertical section extending between the top and bottom of the first shell essentially parallel to the sides of the first shell;
   b) a second shell pivotably mounted to the first shell adjacent a side opposite the first surface of the first shell; and
   c) a fastener mounted in the channel in the first surface of the first shell.

2. The utility shelf of claim 1 wherein the fastener is removably mounted in the channel.

3. The utility shelf of claim 1 wherein a first slot is located in the horizontal section of the channel and a second slot is located in the vertical section of the channel.

4. The utility shelf of claim 3 wherein there are a plurality of fasteners, and wherein at least one fastener is mounted in the first slot and at least one fastener is mounted in the second slot.

5. The utility shelf of claim 1 wherein the bottom of the first shell has a first hinge stop section and the bottom of the second shell has a second hinge stop section adjacent the first hinge stop section, wherein when the utility shelf is in the closed position, the first and second hinge stop sections are spaced apart and wherein when the utility shelf is in an open position, the first and second hinge stop sections are in contact and limit an opening angle between the first and second shells to a predetermined angle.

6. The utility shelf of claim 1 wherein the channel is recessed in the first surface of the first shell.

7. A utility shelf which comprises:
   a) a first shell having a top and an opposed bottom, and a first surface with a channel in the first surface and a second surface opposite the first surface;
   b) a second shell pivotably mounted to the first shell adjacent a side opposite the first surface of the first shell, the second shell having a top and an opposed bottom and having opposed first and second surfaces, and the bottom of the first shell has a first hinge stop section and the bottom of the second shell has a second hinge stop section adjacent the first hinge stop section, wherein the first and second shells are pivotably connected together so that in a closed position, the second surface of the first shell is adjacent the second surface of the second shell and the top of the first shell is adjacent the top of the second shell and the first and second hinge stop sections are spaced apart and wherein when the utility shelf is in an open position, the first and second hinge stop sections are in contact and limit an opening angle between the first and second shells to a 90° angle; and
   c) a fastener mounted in the channel in the first surface of the first shell.

8. The utility shelf of claim 7 wherein a slot is located in the channel in the first surface of the first shell.

9. The utility shelf of claim 8 wherein the slot is positioned essentially in a center of the channel.

10. The utility shelf of claim 8 wherein the fastener is slidably mounted in the slot.

11. The utility shelf of claim 7 wherein the first shell has a top and an opposed bottom with sides extending therebetween and wherein the channel extends between the sides of the first shell essentially parallel to the top of the first shell.

12. The utility shelf of claim 7 wherein the first shell has a top and an opposed bottom with sides extending therebetween and wherein the channel extends between the top and the bottom of the first shell essentially parallel to the sides of the first shell.

13. The utility shelf of claim 7 wherein the first shell has a top and an opposed bottom with sides extending therebetween and wherein the channel has a t-shape with an essentially horizontal section extending between the sides of the first shell essentially parallel to the top and bottom of the first shell and an essentially vertical section extending between the top and bottom of the first shell essentially parallel to the sides of the first shell.

14. A utility shelf which comprises:
   a) a first shell having a top and an opposed bottom with sides extending therebetween and a first surface with a channel in the first surface, the first shell having a first outer lip extending from essentially a center of the top of the first shell along one side of the first shell and partially along the bottom of the first shell;
   b) a second shell pivotably mounted to the first shell adjacent a side opposite the first surface of the first shell, the second shell having a top and an opposed bottom with sides extending therebetween and having a second outer lip extending from essentially a center of the top of the second shell along one side of the second shell and partially along the bottom of the second shell, the first and second outer lips extend along opposed sides of the first and second shells, in use, when the utility shelf is in a closed position, the first and second outer lips form a complete outer lip extending along the top and sides of the first and second shells and the complete outer lip covers an interface of the first and second shells along the top and sides of the shells; and
   c) a fastener mounted in the channel in the first surface of the first shell.

15. The utility shelf of claim 14 wherein a sliding latch having a first half and a second half is provided, wherein the first half is mounted on the first outer lip of the first shell adjacent the center of the top of the first shell and the second half is mounted on the second outer lip of the second shell adjacent the center of the top of the second shell and wherein the first and second halves of the sliding latch connect together to secure the utility shelf in the closed position.

16. The utility shelf of claim 15 wherein the first and second shells are pivotably connected together by hinges at the bottom of the shells and wherein the hinges are movable such that the first and second shells are moved in opposed side to side directions to engage and disengage the first and second halves of the sliding latch.

17. A method for providing a portable utility shelf mounted on an object which comprises the steps of:
   a) providing a utility shelf having a first shell having a top and an opposed bottom with a first surface and a second surface extending therebetween and having a channel in the first surface, the channel having a t-shape with a first horizontal section and a second vertical section, a second shell having a top and an opposed bottom with a first surface and a second surface extending therebetween, the first and second shells pivotably connected together at the bottoms so that in a closed position, the second surface of the first shell is adjacent the second surface of the second shell and the top of the first shell is adjacent the top of the second shell;

b) providing two or more fasteners mounted in the channel in the first surface of the first shell wherein the fasteners are selected based on the object and an intended use of the shelf;
c) positioning the fastener in the channel based on the object and the intended use of the shelf wherein at least one of the fasteners is positioned in the first horizontal section of the channel and at least one of the fasteners is positioned in the second vertical section of the channel;
d) mounting the first shell on the object so that the fastener is in contact with the object and the utility shelf is secured to the object; and
e) moving the utility shelf to an open position so that the top of the second shell is pivoted away from the top of the first shell and extends outward from the object and so that the second surface of the second shell creates a work surface.

18. The method of claim 17 wherein the utility shelf has a sliding latch having a first half and a second half, wherein the first half of the sliding latch is located on the top of the first shell and the second half of the sliding latch is located on the top of the second shell adjacent the first half, wherein in the closed position, the first and second halves of the sliding latch are engaged to hold the first and second shells together in the closed position, and wherein further in step (e) to move the utility shelf to the open position, the second shell is moved in a sidewards direction so that the second half of the sliding latch is moved away from and out of contact with the first half of the sliding latch.

19. A method for providing a portable utility shelf mounted on an object which comprises the steps of:
a) providing a utility shelf having a first shell having a top and an opposed bottom with a first surface and a second surface extending therebetween and having a channel in the first surface with a first hinge stop section mounted on the bottom of the first shell, a second shell having a top and an opposed bottom with a first surface and a second surface extending therebetween with a second hinge stop mounted on the bottom of the second shell, the first and second shells pivotably connected together at the bottoms so that in a closed position, the second surface of the first shell is adjacent the second surface of the second shell and the top of the first shell is adjacent the top of the second shell;
b) providing a fastener mounted in the channel in the first surface of the first shell wherein the fastener is selected based on the object and an intended use of the shelf;
c) positioning the fastener in the channel based on the object and the intended use of the shelf;
d) mounting the first shell on the object so that the fastener is in contact with the object and the utility shelf is secured to the object; and
e) moving the utility shelf to an open position so that the first hinge stop section on the first shell contacts the second hinge stop section on the second shell and the top of the second shell is pivoted away from the top of the first shell and extends outward from the object and the first shell at a 90° angle so that the second surface of the second shell creates a work surface.

20. The method of claim 19 wherein the channel in the first surface of the first shell has a t-shape with a first horizontal section and a second vertical section, wherein further in step (b), more than one fastener is provided and wherein at least one of the fasteners is positioned in the first horizontal section of the channel and at least one of the fasteners is positioned in the second vertical section of the channel.

* * * * *

UNITED STATES PATENT AND TRADEMARK OFFICE
CERTIFICATE OF CORRECTION

PATENT NO. : 8,347,792 B2
APPLICATION NO. : 13/433866
DATED : January 8, 2013
INVENTOR(S) : Albert Manuel Lopez, Jr.

It is certified that error appears in the above-identified patent and that said Letters Patent is hereby corrected as shown below:

In the Specifications:

Col. 1, Line 22, delete "shelf In" and insert --shelf. In--.

In the Claims:

Col. 11, Claim 18, Line 8, after "further" delete "in step (e)".

Col. 12, Claim 20, Lines 3 and 4, after "section, wherein" delete "further in step (b)".

Signed and Sealed this
Fourteenth Day of May, 2013

Teresa Stanek Rea
*Acting Director of the United States Patent and Trademark Office*